United States Patent [19]
Petersen et al.

[11] 3,829,725
[45] Aug. 13, 1974

[54] RECTIFIER ASSEMBLY FOR BRUSHLESS EXCITATION SYSTEMS

[75] Inventors: Sigrud R. Petersen, Irwin; Josiah L. Young, Export, both of Pa.

[73] Assignee: Westinghouse Electric Corporation, Pittsburgh, Pa.

[22] Filed: Feb. 21, 1973

[21] Appl. No.: 334,327

[52] U.S. Cl. ............................... 310/68 D, 310/72
[51] Int. Cl. .......................................... H02k 11/00
[58] Field of Search............ 310/68 R, 68 D, 71, 72

[56] References Cited
UNITED STATES PATENTS
3,368,091  2/1968  Layman ........................... 310/68 R
3,371,235  2/1968  Hoover ............................ 310/68 R
3,590,291  6/1971  Spisak et al. ..................... 310/68 D

*Primary Examiner*—J. D. Miller
*Assistant Examiner*—Robert J. Hickey
*Attorney, Agent, or Firm*—G. H. Telfer

[57]  ABSTRACT

In a brushless excitation system, a rotating rectifier assembly is provided in which the rectifier diodes and associated fuses are mounted on heat sinks which are supported about the periphery of a rotatable support wheel.

6 Claims, 6 Drawing Figures

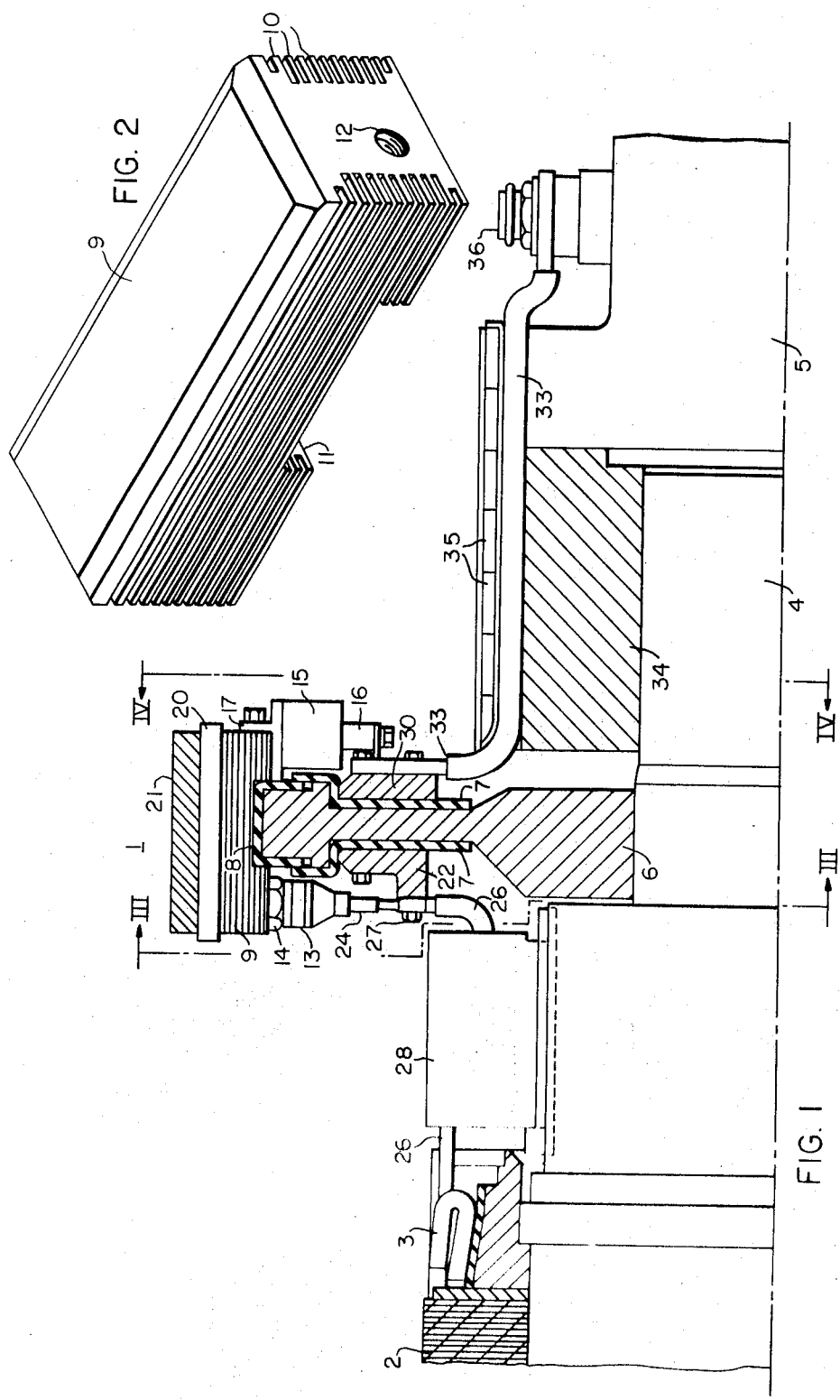

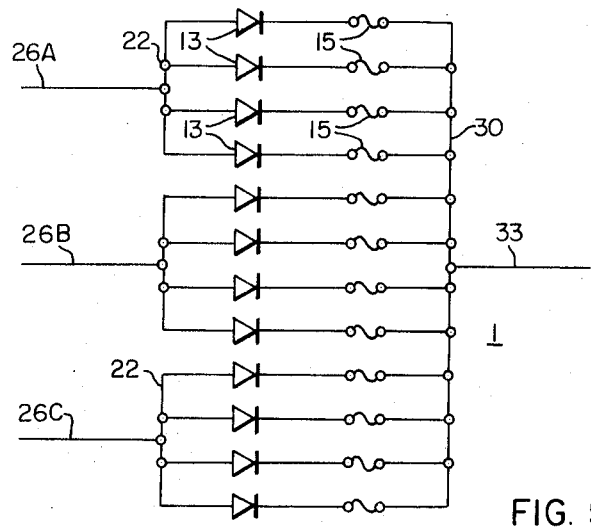
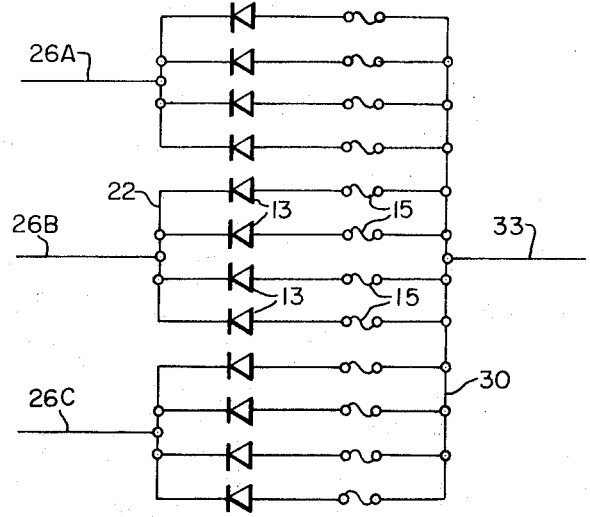
FIG. 5
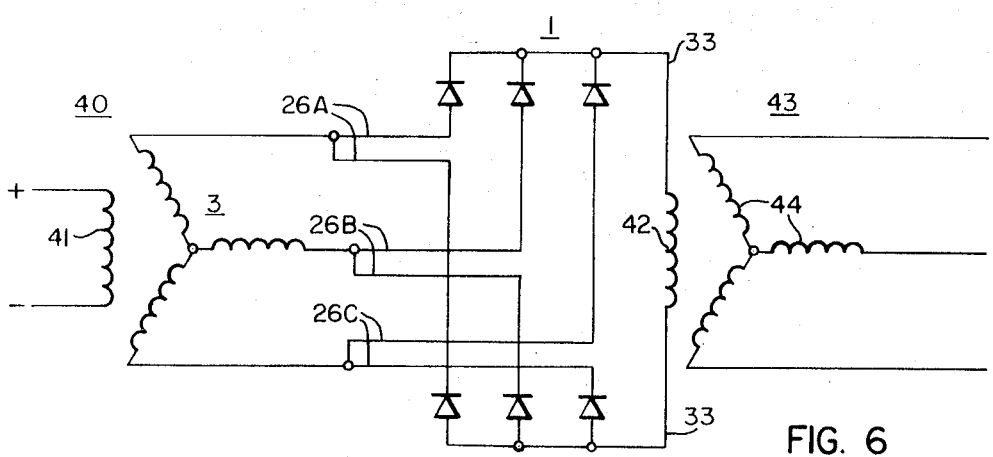
FIG. 6

RECTIFIER ASSEMBLY FOR BRUSHLESS EXCITATION SYSTEMS

BACKGROUND OF THE INVENTION

The present invention relates to brushless excitation systems for alternating current generators, and more particularly to an improved construction and arrangement of the rotating rectifier assembly of such excitation systems.

Brushless excitation systems are now widely used for supplying direct current field excitation to large alternating current generators. Such an excitation system includes an alternating current exciter having a stationary field structure and a rotating armature member. A rotating rectifier assembly is carried on a common shaft with the exciter armature and connected thereto to provide a direct current output. The output of the rectifier is supplied to the field winding of the main generator which also rotates with the exciter armature and rectifier. In this way, an excitation system is provided which requires no commutator or slip rings and no sliding contacts.

The rectifier assembly for such an excitation system utilizes a suitable number of rectifier diodes to provide the required output current with the necessary fuses for protection and with heat sinks for dissipating the heat generated during operation. Additional components such as capacitors and resistors may also be required in some cases. Heretofore, these various components have been supported on high strength steel wheels mounted on a rotatable shaft and having axially extending cylindrical rim portions. The components of the rectifier circuit were mounted on the inside cylindrical surface of the rim in a manner to support the rectifier circuit components against rotational forces as shown for example in Hoover U.S. Pat. No. 3,371,235. This type of construction requires relatively long and expensive wheels and the rectifier assemblies were difficult to manufacture because of the large number of components, connectors and supports which had to be placed inside the wheels. One or two of these wheels occupied a very substantial axial distance and, in addition, a fan or blower was usually mounted on the shaft to circulate cooling air for ventilation of the alternating current exciter as well as the rectifier assembly. Thus, these prior rectifier assemblies were difficult and expensive to manufacture and were undesirably long.

SUMMARY OF THE INVENTION

In accordance with the present invention, a rotating rectifier assembly for brushless excitation systems, is provided which requires relatively few components and is easily assembled and which requires relatively little axial space. In the new assembly, the diodes and fuses are mounted on heat sinks which connect them together in a plurality of diode assemblies, and these assemblies are disposed about the periphery of a rotatable support member or wheel and secured thereon by a retaining means which may be an insulated ring encircling the outside of the heat sinks. In this way, a compact assembly is provided which is relatively easy and inexpensive to manufacture and which requires relatively little axial space. A minimum number of components is required and the rotating rectifier assembly can readily be designed to produce sufficient fan action for circulation of ventilating air through the associated alternating current exciter as well as for ventilation of the rectifier assembly itself.

BRIEF DESCRIPTION OF THE DRAWINGS

The invention will be more fully understood from the following detailed description of a preferred embodiment, taken in connection with the accompanying drawings, in which:

FIG. 1 is a longitudinal sectional view of a rotating rectifier assembly embodying the invention taken substantially on the line I—I of FIG. 3;

FIG. 2 is a perspective view of a heat sink;

FIG. 5 is a schematic diagram showing the electrical circuit of the rectifier assembly; and FIG. 6 is a schematic diagram of a complete brushless excitation system.

DESCRIPTION OF A PREFERRED EMBODIMENT

Figure 3:
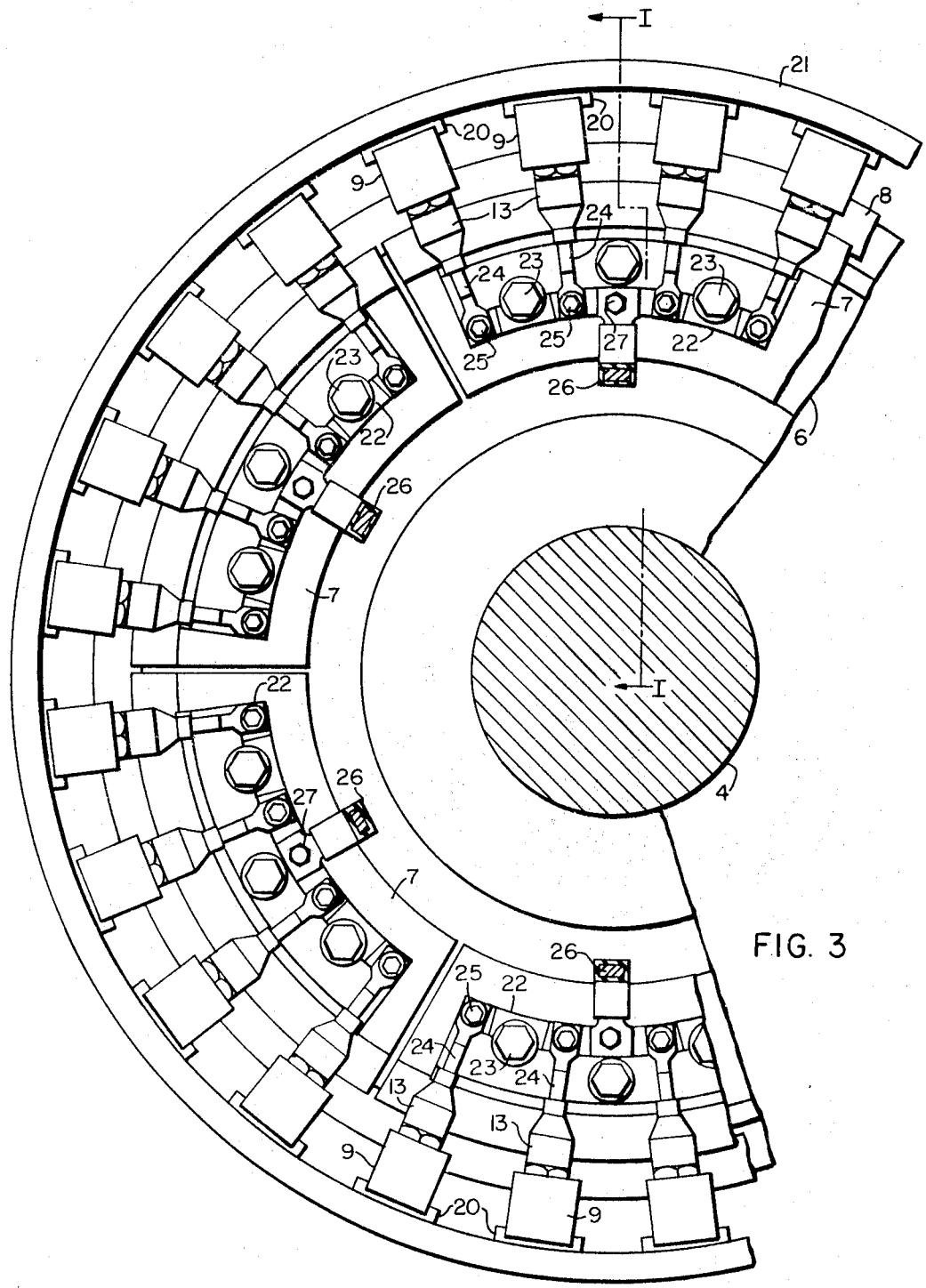
FIG. 3 is a transverse view substantially on the line III—III of FIG. 1.
Figure 4:
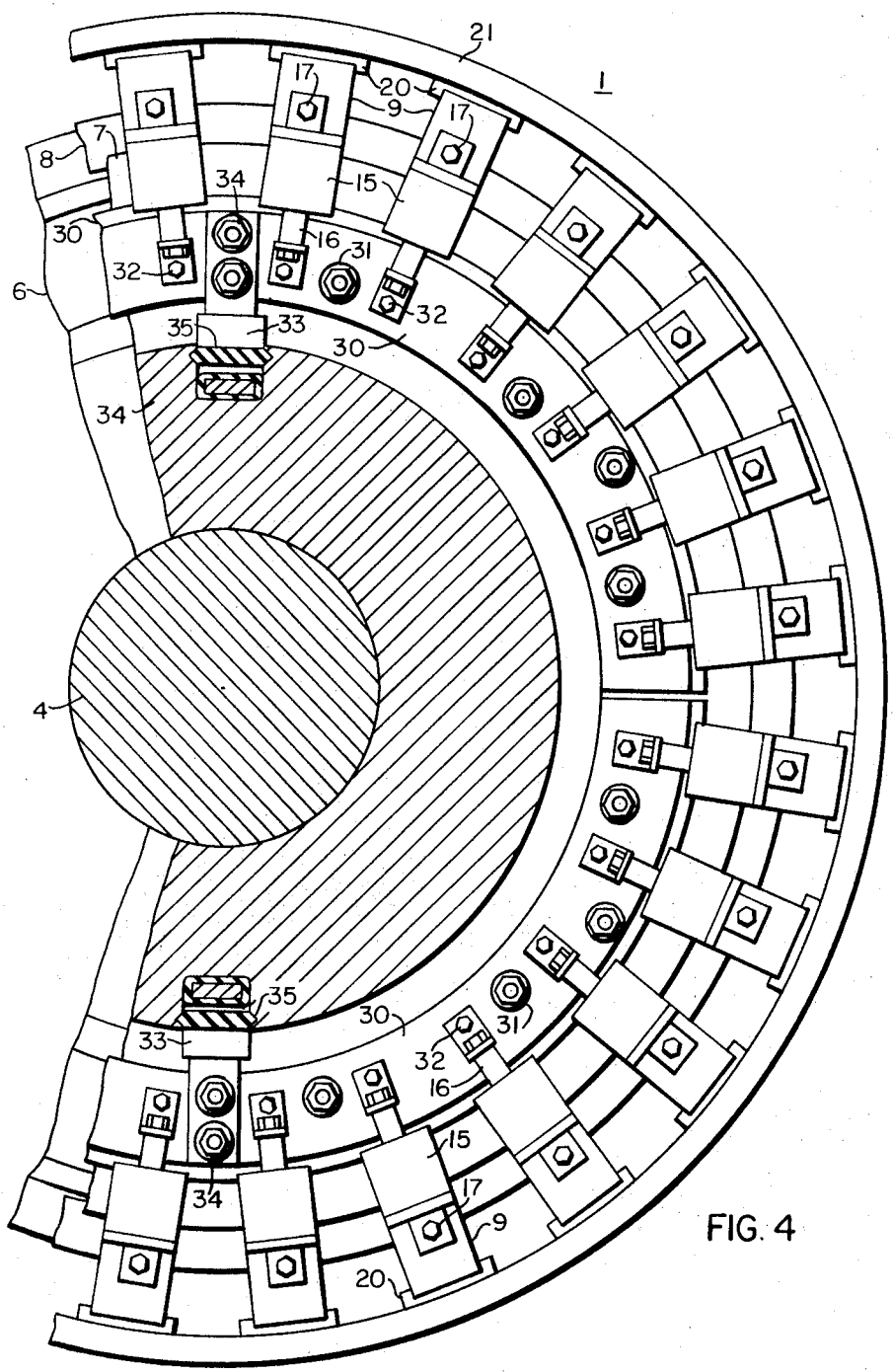
FIG. 4 is a transverse view substantially on the line IV—IV of FIG. 1.

As previously indicated, the invention relates to a rotating rectifier assembly for brushless excitation systems. As shown in FIG. 1, such a system includes a rotating rectifier assembly generally indicated at 1 and an alternating current exciter having an armature member 2 carrying a suitable armature winding 3. The armature 2 and rectifier assembly 1 are preferably mounted on a common shaft 4 for rotation therewith, and the shaft 4 may be integral with or coupled to the shaft 5 of a main generator which carries the rotating field winding which is to be excited from the output of the rectifier 1.

As shown in the drawings the rectifier assembly 1 includes a circular support member or wheel 6 mounted on the shaft 4 for rotation therewith. The wheel 6 may be made of steel or other suitable material of sufficient strength and is suitably insulated. In the illustrated embodiment, generally arcuate sections of insulating material 7 are applied to both sides of the wheel and cemented or otherwise secured thereto, and a generally channel-shaped insulating member 8 is placed on the rim of the wheel 6 so that the entire periphery of the wheel is covered with insulation. It will be understood, of course, that the wheel 6 may be provided with insulation of any desired type to effectively insulate the components carried thereon from the wheel.

A plurality of diode assemblies are disposed about the periphery of the wheel 6. Each diode assembly includes a heat sink 9 which, as shown in FIG. 2, consists of a generally rectangular block of suitable material of high thermal and electrical conductivity such as aluminum or copper. The heat sink 9 may be provided with fins 10 to increase the radiating surface and therefore the heat dissipating ability, and has a central recess 11 formed in its lower surface for engaging the wheel 6. A threaded hole 12 may be provided in one end and a similar mounting hole may be provided in the lower surface of the heat sink adjacent the other end.

The heat sinks 9 are used as mounting supports and electrical connections for the components of the rectifier circuit. A diode 13 is mounted in one end of each heat sink. The diodes 13 are of the stud-mounted type having studs which serve as one terminal as well as a mounting means. The studs are threaded into the mounting holes mentioned above in the lower surfaces of the heat sinks 9 and are secured in place by lock nuts 14. At the other end of each heat sink 9 is mounted a fuse 15. The fuses 15 may be of any suitable type capable of withstanding high rotational speeds and have a terminal member 16 at one end and a terminal lug 17 at the other end which is attached to the heat sink 9 by a screw threaded into the mounting hole 12. Thus, each diode assembly consists of a heat sink 9 with a diode 13 mounted in thermal and electrical contact at one end and a fuse 15 mounted in electrical contact at the other end.

A suitable number of diode assemblies as described above is provided and they are disposed equally spaced apart around the periphery of the wheel 6. The heat sinks 9 are placed on the rim of the wheel with the central recess 11 engaging the wheel rim, the heat sink being insulated from the wheel by the insulating channel 8, and the heat sinks are preferably placed with all the diodes 13 on one side of the wheel and the fuses 15 on the opposite side as shown in the drawings. The outer or top sides of the heat sinks 9 are provided with insulation of any suitable type, such as the insulating channel members 20 shown in the drawings, and the diode assemblies are retained in position on the wheel 6 by a retaining member 21 which encircles the entire assembly and engages the heat sinks 9 to retain them in position. The retaining member 20 may be a steel ring of suitable size shrunk or otherwise firmly clamped in engagement with the heat sinks to hold them in position, the ring 21 being insulated from the heat sinks by the insulating members 20. It will be understood of course that the retaining member 21 might be any suitable type of ring member of sufficient strength and might be made of insulating material such as glass tape impregnated with a suitable resin wound on the assembly under tension and the resin then cured. If such an insulating material is utilized, the insulating member 20 would be unnecessary and could be omitted. It will be seen that the diode assemblies are thus rigidly supported in position on the rim of the wheel 6 so that a mechanically stable assembly is provided which is capable of rotation at high speeds without risk of vibration or looseness.

The electrical connections of the rectifier circuit are made by means of connectors on the wheel 6. Thus, as shown in FIG. 3 the diodes 13 are connected together by generally arcuate connectors 22 which may be cut from an aluminum ring, or may be made of other suitable conductive material and which are attached to the wheel by bolts 23, being insulated from the wheel by the insulation 7. In the particular embodiment of the invention illustrated in the drawings, there are 24 diodes divided into six groups of four diodes each, and there are accordingly six connectors 22 attached to the wheel 6 and spaced apart as shown. The diodes 13 have leads 24 and the diodes of each group are attached to the corresponding connectors by means of screws 25 which connect the leads 24 to the connectors. The diode groups thus formed are connected to leads from the winding 3 of the alternating current exciter. In the illustrated embodiment, six leads 26 are brought from the armature winding 3 and connected to the appropriate connectors by screws 27 or by other suitable means. The leads 26 are brought along the shaft 4 and supported against centrifugal force and vibration by a suitable support ring 28 or other supporting means to hold them firmly in place on the shaft 4. In order to provide a complete rectifier bridge circuit on the wheel 6, diodes of opposite polarity must be included. In the particular embodiment shown, the twelve diodes in the three groups on the upper half of the wheel 6 are all of one polarity with respect to the heat sinks, and the 12 diodes in the three groups on the lower half of the wheel 6 are of opposite polarity. It will be understood that, in general, the diodes may be arranged in any suitable or desired manner for any particular number of diodes that may be required, and the polarity and disposition of the diodes may be determined as required by a particular circuit configuration.

As indicated above each diode 13 is connected to its associated fuse 15 by the heat sink 9 on which both are mounted. The rectifier circuit is therefore completed by the fuses 15 on the opposite side of the wheel 6. The fuses 15 are connected together by means of arcuate connectors 30 attached to the wheel 6 by screws 31 or in any suitable manner and insulated from the wheel by the insulation 7. Since the diodes are arranged as described above with all the diodes of one polarity on one half of the wheel and the diodes of opposite polarity on the other half of the wheel, the fuses are similarly connected together. That is, all the fuses connected to diodes of one polarity are connected together by one connector 30 covering approximately half the circumference of the wheel, and the remaining fuses connected to diodes of opposite polarity are connected together by another connector 30 extending around the opposite half of the wheel and spaced from the first connector. Each fuse 15 is connected to its corresponding connector 30 by means of a screw 32 which connects the terminal 16 of the fuse to the connector 30. The two connectors 30 constitute the direct current output busses of the rectifier assembly, and each connector 30 is electrically connected to an output lead 33 by means of screws 34. The leads 33 extend longitudinally of the shaft 4 and may be secured in place in any suitable manner. In the illustrated embodiment, the leads 33 are disposed in slots in a member 34 which may be a supporting sleeve or which may be a part of a coupling for connecting the shaft 4 to a flange on the generator shaft 5 to be driven thereby. The leads 33 extend through slots in the member 34 and are held therein by insulating wedges 35. The leads 33 may be connected to the generator field winding (not shown) by means of radial leads 36 in the usual manner.

The electrical circuit of the rectifier assembly 1 is shown schematically in FIG. 5. It will be noted that the three uppermost groups of diodes 13 are of one polarity with respect to the output lead 33 in which they are connected and the diodes 13 of the three lower groups are of opposite polarity with respect to their output lead 33. This corresponds to the physical arrangement of the diodes on the wheel 6 as described above. In order to constitute a three-phase rectifier bridge circuit one group of each polarity is connected to each phase of the exciter winding. Thus, one group of each polarity is connected by leads 26A to one exciter phase, another group of each polarity is connected by leads 26B to another phase, and the third group of each polarity is connected by leads 26C to the third phase.

A typical brushless excitation system is shown in FIG. 6 which further illustrates the manner in which the circuit of FIG. 5 forms the three-phase bridge circuit. As shown in FIG. 6, the excitation system includes an alternating current exciter 40 having a stationary field winding 41 excited from any suitable source of direct current and cooperating with the exciter armature winding 3. Two parallel leads are brought from each phase of the armature winding 3, the three sets of leads being designated 26A, 26B and 26C, respectively, and connected to the diodes of the rotating rectifier assembly 1 in the manner described above. It will be seen that a three-phase rectifier bridge circuit is thus provided, and the output leads 33 may be connected to the field winding 42 of the main alternating current generator 43 which is shown having a stationary armature winding 44.

It should now be apparent that a rotating rectifier assembly has been provided which has many advantages. The assembly is relatively compact and requires little axial space since the components of the rectifier circuit are arranged around the periphery of a rotatable support wheel. The assembly is thus simple and inexpensive and the number of components required is kept to a minimum. The design is such that the heat sinks themselves act as fan blades to cause a substantial flow of air through the space between the wheel 6 and the retaining ring 21 and thus a sufficient flow of air is provided for ventilation of the rotating exciter armature as well as the rectifier as well as the rectifier assembly itself. The necessity for a separate fan is thus eliminated. It will be understood of course that various other modifications and embodiments are possible. The diodes and fuses may be arranged and connected in any desired manner to suit different circuit configurations, as mentioned above, and two or more support wheels with rectifier assemblies could be utilized in tandem if desired for a higher capacity. Thus, various other embodiments and modifications are possible within the scope of the invention.

We claim as our invention:

1. In a brushless excitation system, a rotatable rectifier assembly comprising: a circular support member adapted to be mounted on a shaft, a plurality of diode assemblies disposed about the periphery of the support member, each of the diode assemblies including a heat sink, a diode mounted on the heat sink and a fuse mounted on the heat sink, the heat sinks having a central recess engaging the periphery of the support member and being insulated therefrom, a retaining member engaging the heat sinks to hold them in position, means for making electrical connections to the diodes, and means for making electrical connections to the fuses.

2. The combination of claim 1 in which each heat sink comprising a block of thermally and electrically conductive material, the diode of each of the diode assemblies being mounted in thermal and electrical contact with the associated heat sink at one side of the central recess, and the fuse of each of the diode assemblies being mounted in electrical contact with the associated heat sink at the other side of the central recess, the heat sinks being disposed so that all the diodes are on one side of the support member and all the fuses on the other side.

3. The combination of claim 1 in which the diodes are electrically connected to an exciter armature and the fuses are connected to output leads.

4. The combination of claim 1 in which the retaining member is a ring encircling the heat sinks and insulated therefrom, said ring engaging all the heat sinks to hold them in position on the periphery of the support member.

5. The combination of claim 1 in which all the diodes are on one side of the support member and all the fuses on the other side, one-half of the diodes being of one polarity with respect to the heat sinks and the remaining diodes being of opposite polarity, generally arcuate connectors mounted on the diode side of the support member for connecting the diodes of each polarity in a plurality of groups, means for making electrical connection to said connectors, two generally arcuate connectors mounted on the fuse side of the support member, all the fuses associated with diodes of one polarity being connected to one of the last-mentioned connectors and the fuses associated with diodes of opposite polarity being connected to the other of the last mentioned connectors, and means for making electrical connection to each of the last-mentioned connectors.

6. The combination of claim 5 in which all the diodes of one polarity are disposed about one-half of the circumference of the support member and the diodes of opposite polarity are disposed about the other half of the circumference.

* * * * *